US012639317B1

(12) United States Patent
Dong et al.

(10) Patent No.: US 12,639,317 B1
(45) Date of Patent: May 26, 2026

(54) INTEGRATION OF ANCHOR INFORMATION FOR RETRIEVAL AUGMENTED GENERATION

(71) Applicant: Zoom Video Communications, Inc., San Jose, CA (US)

(72) Inventors: Qiumin Dong, Suzhou (CN); Tao Huang, Hangzhou (CN); Ying Lu, Cerritos, CA (US); Kai Ni, Sammamish, WA (US); Wang Tian, Hefei (CN); Rubing Yang, Hefei (CN); Zhenyi Ye, Aliso Viejo, CA (US); Yingying Zhang, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/785,614

(22) Filed: Jul. 26, 2024

(51) Int. Cl.
*G06F 16/2457* (2019.01)
*G06F 16/242* (2019.01)
*G06F 40/289* (2020.01)

(52) U.S. Cl.
CPC ...... *G06F 16/24578* (2019.01); *G06F 16/242* (2019.01); *G06F 40/289* (2020.01)

(58) Field of Classification Search
CPC . G06F 16/24578; G06F 16/242; G06F 40/289
See application file for complete search history.

(56) References Cited

U.S. PATENT DOCUMENTS

| | | | | |
|---|---|---|---|---|
| 12,265,590 B1 * | 4/2025 | Shiokawa | ............... | G06F 40/30 |
| 2023/0065468 A1 * | 3/2023 | Lu | ........................... | G10L 15/063 |
| 2023/0186225 A1 * | 6/2023 | Vepa | ..................... | G06F 40/295 |
| | | | | 705/7.42 |
| 2024/0311407 A1 * | 9/2024 | Barron | ................ | G06F 16/3344 |
| 2024/0356875 A1 * | 10/2024 | Medalion | ................ | G06F 40/35 |
| 2024/0386253 A1 * | 11/2024 | White, Jr. | ............. | G06F 40/166 |
| 2025/0094688 A1 * | 3/2025 | Aggarwal | ............. | G06F 40/166 |
| 2025/0211549 A1 * | 6/2025 | Arunachalam | ......... | H04L 51/02 |

* cited by examiner

*Primary Examiner* — Jay A Morrison

(74) *Attorney, Agent, or Firm* — Kilpatrick Townsend & Stockton, LLP

(57) ABSTRACT

Systems and methods for integration of anchor information for retrieval augmented generation are provided. A communication platform accesses communication data associated with an enterprise on the communication platform. The communication platform divides the communication data into multiple data chunks. The communication platform generates one or more extended queries for each data chunk of the multiple data chunks using a generative AI model. The communication platform receives a user query, and identifies, from the multiple data chunks, one or more relevant data chunks for the user query at least by comparing the user query with the one or more extended queries associated with each data chunk of the multiple data chunks. The communication platform provides an answer to the user query based on the one or more relevant data chunks.

16 Claims, 7 Drawing Sheets

600

```
┌─────────────────────────────────────────────────────────────────────┐
│  ACCESS COMMUNICATION DATA ON A COMMUNICATION PLATFORM ASSOCIATED     │
│                     WITH AN ENTERPRISE                                │
│                           602                                         │
└─────────────────────────────────────────────────────────────────────┘
                                 │
                                 ▼
┌─────────────────────────────────────────────────────────────────────┐
│         DIVIDE THE COMMUNICATION DATA INTO MULTIPLE DATA CHUNKS       │
│                           604                                         │
└─────────────────────────────────────────────────────────────────────┘
                                 │
                                 ▼
┌─────────────────────────────────────────────────────────────────────┐
│   GENERATE ONE OR MORE EXTENDED QUERIES FOR EACH DATA CHUNK OF THE    │
│       MULTIPLE DATA CHUNKS USING A GENERATIVE AI MODEL                │
│                           606                                         │
└─────────────────────────────────────────────────────────────────────┘
                                 │
                                 ▼
┌─────────────────────────────────────────────────────────────────────┐
│             RECEIVE A USER QUERY FROM A CLIENT DEVICE                  │
│                           608                                         │
└─────────────────────────────────────────────────────────────────────┘
                                 │
                                 ▼
┌─────────────────────────────────────────────────────────────────────┐
│  IDENTIFY ONE OR MORE RELEVANT DATA CHUNKS FOR A USER QUERY AT LEAST BY│
│    COMPARING THE USER QUERY WITH THE ONE OR MORE EXTENDED QUERIES      │
│     ASSOCIATED WITH EACH DATA CHUNK OF THE MULTIPLE DATA CHUNKS        │
│                           610                                         │
└─────────────────────────────────────────────────────────────────────┘
                                 │
                                 ▼
┌─────────────────────────────────────────────────────────────────────┐
│    PROVIDE AN ANSWER FOR THE USER QUERY BASED ON THE ONE OR MORE      │
│                     RELEVANT DATA CHUNKS                               │
│                           612                                         │
└─────────────────────────────────────────────────────────────────────┘
```

*FIG. 6*

INTEGRATION OF ANCHOR INFORMATION FOR RETRIEVAL AUGMENTED GENERATION

FIELD

The present application generally relates to information retrieval and more specifically relates to integration of anchor information for retrieval augmented generation (RAG).

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 6 shows an example process for integration of anchor information for RAG-based searches;

DETAILED DESCRIPTION

Figure 1:
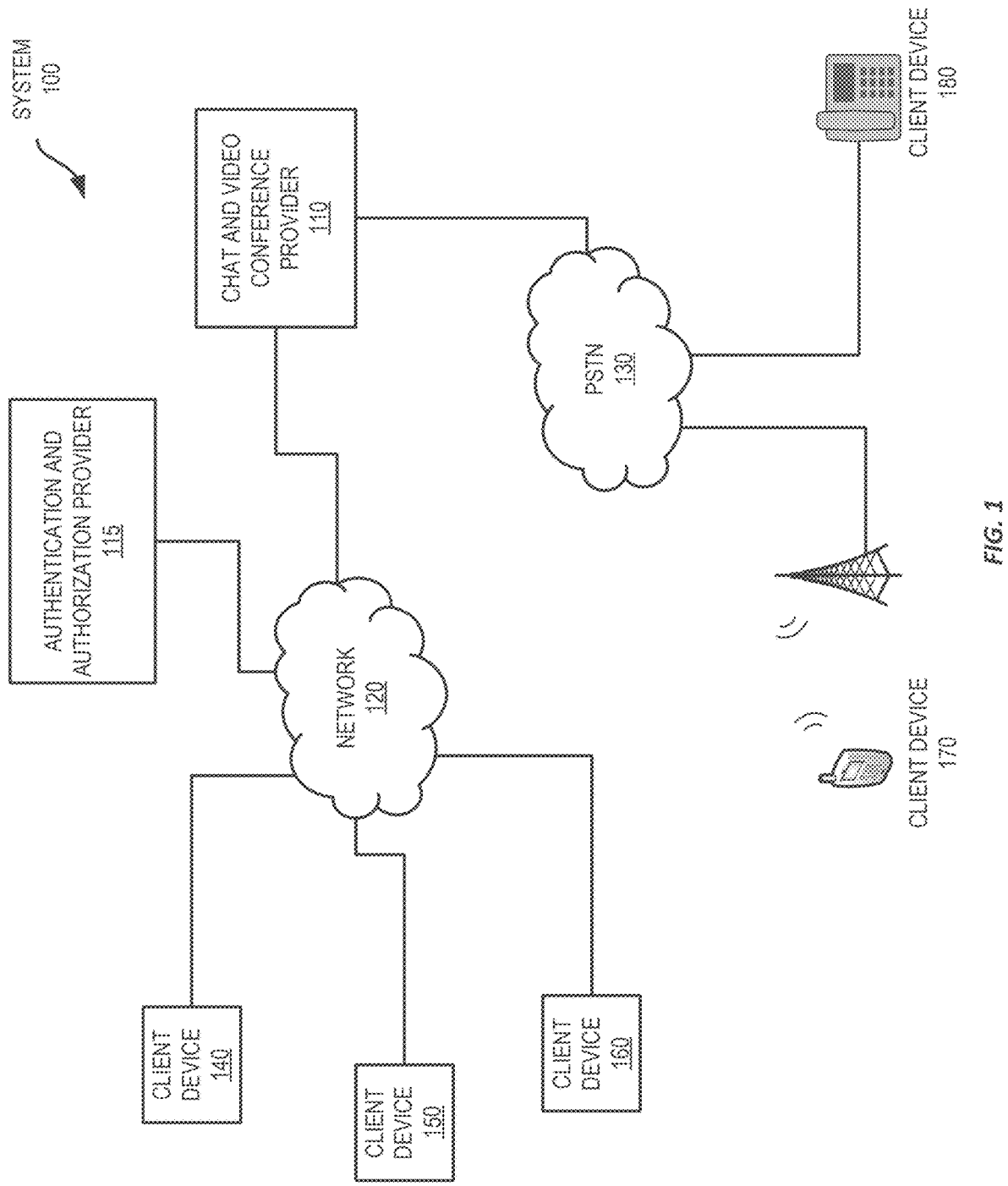
FIG. 1 shows an example system that provides chat and videoconferencing functionality to various client devices.

Examples are described herein in the context of integration of anchor information for RAG-based searches. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Retrieval Augmented Generation (RAG) is a technique to retrieve up-to-date data from available databases for a generative artificial intelligence (AI) system. The quality of the content provided by RAG is crucial for the generative AI system to provide relevant information to user queries. Traditional search methods used in RAG or other search systems are often based on matching between text and user queries or between text embeddings and user query embeddings. However, these traditional methods often cannot accurately capture the diverse range of content for a user query.

To improve search recalls, certain information can be added or anchored to database content to facilitate searches and data retrieval. In one example, a communication platform includes an information anchoring engine configured to integrate certain information to database content associated with an enterprise and a search engine to search for and retrieve certain content related to a user query based on the information anchored to the database content.

The information anchoring engine or another engine on the communication platform divides database content associated with an enterprise into data chunks within a predetermined size threshold (e.g., 500 words). For example, a meeting transcript is divided into multiple data chunks by topics or by time to satisfy the predetermined size threshold. The information anchoring engine includes a keyword extraction module to extract keywords from a data chunk, using a keyword extraction algorithm (e.g., Text Rank, Rapid Automatic Keyword Extraction (RAKE)). The information anchoring engine also includes a key phrase generation module to generate one or more key phrases to summarize the data chunk. For example, a data chunk includes a paragraph describing actions by leaders of a company that improve morale among employees, goals and policies set by the leaders for the company that drive the company to grow, or how the leaders help each employee to succeed and grow in the company. The key phrase generation module generates a key phrase for the data chunk, such as "importance of the leadership in setting company culture." In some examples, the key phrase is extractive, namely extracted from the data chunk. The extractive key phrases can be extracted from the data chunk using extraction algorithms similar to the keyword extraction algorithms. In some examples, the key phrase is abstractive, namely paraphrased from the data chunk. The key phrase generation module users or implements a generative artificial intelligence (AI) model to generate an abstractive key phrase for a data chunk. The information anchoring engine also includes an extended query generation module, configured to generate one or more extended queries for a data chunk, using a generative AI model. The one or more extended queries include questions to which the content of the data chunk can be the answer. For example, an extended query for a data chunk is "what is the role of leadership in conflict resolution?" The extended query generation module can generate multiple extended queries for a data chunk to include possible questions the data chunk can answer.

The information anchoring engine anchors, integrates, or attaches the keywords, key phrases, and extended queries to a corresponding data chunk. In some examples, the information anchoring engine generates embeddings for the extended queries, using an embedding model. The extended query embeddings can also be attached or anchored to the data chunk. In some examples, the information anchoring engine or another engine on the communication platform generates embedding for data chunks and attaches the data chunk embeddings to corresponding data chunks.

In an example, a user enters a user query on the communication platform. The search engine generates an embedding for the user query, and determines a similarity between the user query and a data chunk by comparing the user query embedding to extended query embeddings associated with the data chunk. If a similarity score for an extended query embedding satisfies a threshold, the search engine retrieves the corresponding data chunk for generating an answer to the user query. Alternatively, or additionally the search engine also compares the user query with keywords or key phrases anchored to a data chunk to determine matching or similarity. Alternatively, or additionally, the information retrieval engine compares the user query to a data chunk or compare the user query embedding to a data chunk embedding for a corresponding data chunk to determine matching or similarity. This way, multiple data chunks can be identified as relevant data chunks for the user query. In some examples, the information retrieval engine implements an AI-based reranking model to rerank the identified data chunks based on their similarities to the user query. The search engine uses or implements a generative AI model to generate an answer to the user query based on a subset of data chunks from the top of the ranking.

Thus, integration of keywords, key phrases, and extended queries expands the search scope and improve search recalls and accuracy. The reranking model can enhance precision. In other words, by leveraging extended queries, key phrases, and keywords anchored to available database content for information retrieval, a generative AI system improves RAG quality and efficiency for responding to user queries. This illustrative example is given to introduce the reader to the general subject matter discussed herein and the disclosure is not limited to this example. The following sections describe various additional non-limiting examples and examples of integration of anchor information for retrieval augmented generation.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
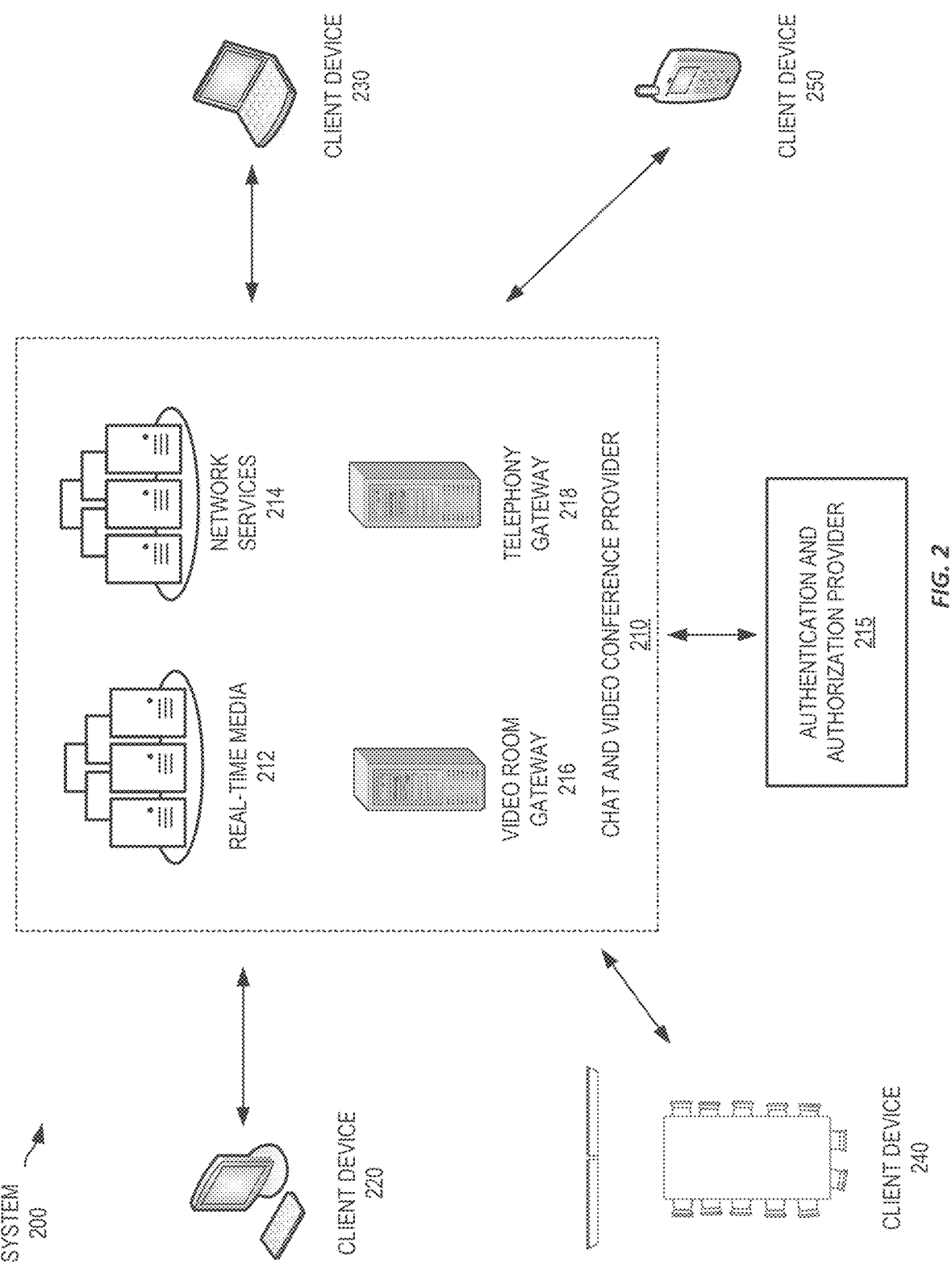
FIG. 2 shows an example system in which a chat and video conference provider provides chat and videoconferencing functionality to various client devices.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it.

Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
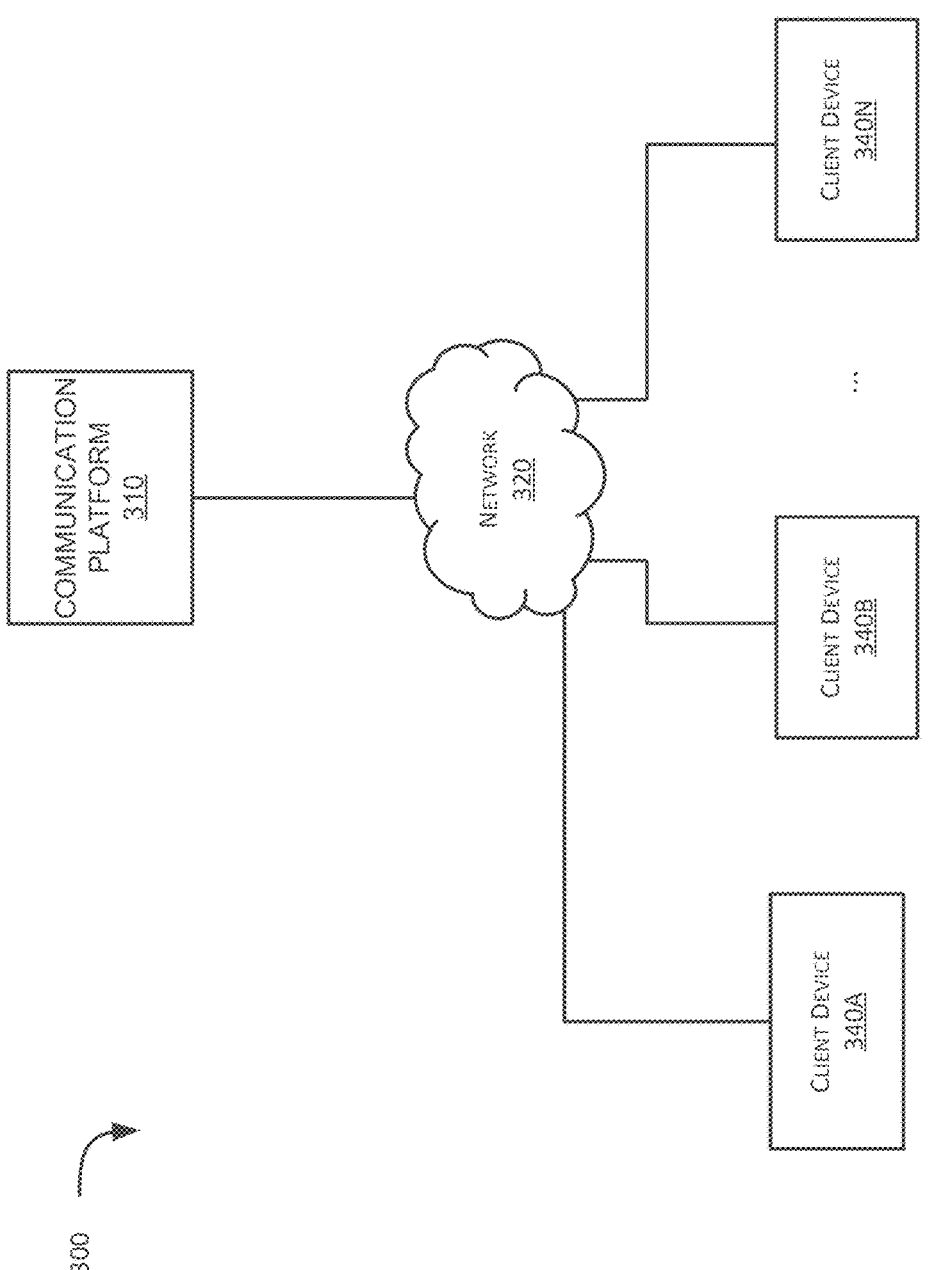
FIG. 3 shows an example system that can establish a virtual communication session.

Referring now to FIG. 3, FIG. 3 shows an example system 300 that can establish a virtual communication session. In this example system 300, a communication platform 310 and a number of client devices 340A-340N (which may be referred to herein individually as a client device 340 or collectively as the client devices 340) are connected via a network 320. The communication platform 310 can be the chat and video conference provider 110 in FIG. 1 or the chat and video conference provider 210 in FIG. 2. The network 320 can be the internet or any suitable communications network or combination of communications network may be employed, including LANs (e.g., within a corporate private LAN), WANs, MANS, cellular network (e.g., 3G, 4G, 4G LTE, 5G, etc.), or any combination of these.

The client devices 340 can be any suitable computing or communications device. The client device 340 can be a client device (e.g., 140, 150, 160, or 170) in FIG. 1 or a client device (e.g., 220, 230, or 250) in FIG. 2. For example, client devices 340 may be desktop computers, laptop computers, tablets, smart phones having processors and computer-readable media, connected to the communication platform 310 using the internet or other suitable computer network. The client devices 340 have communication software installed to enable them to connect to the communication platform 310 for chats, video conferences, emails, and any other suitable communications. For example, during a chat session, a user associated a client device (e.g., client device 340A) can interact with other users associated with other client devices (e.g., client device 340B-340N) via the communication platform 310 by sending and receiving chat messages, and reacting to received chat messages.

Figure 4:
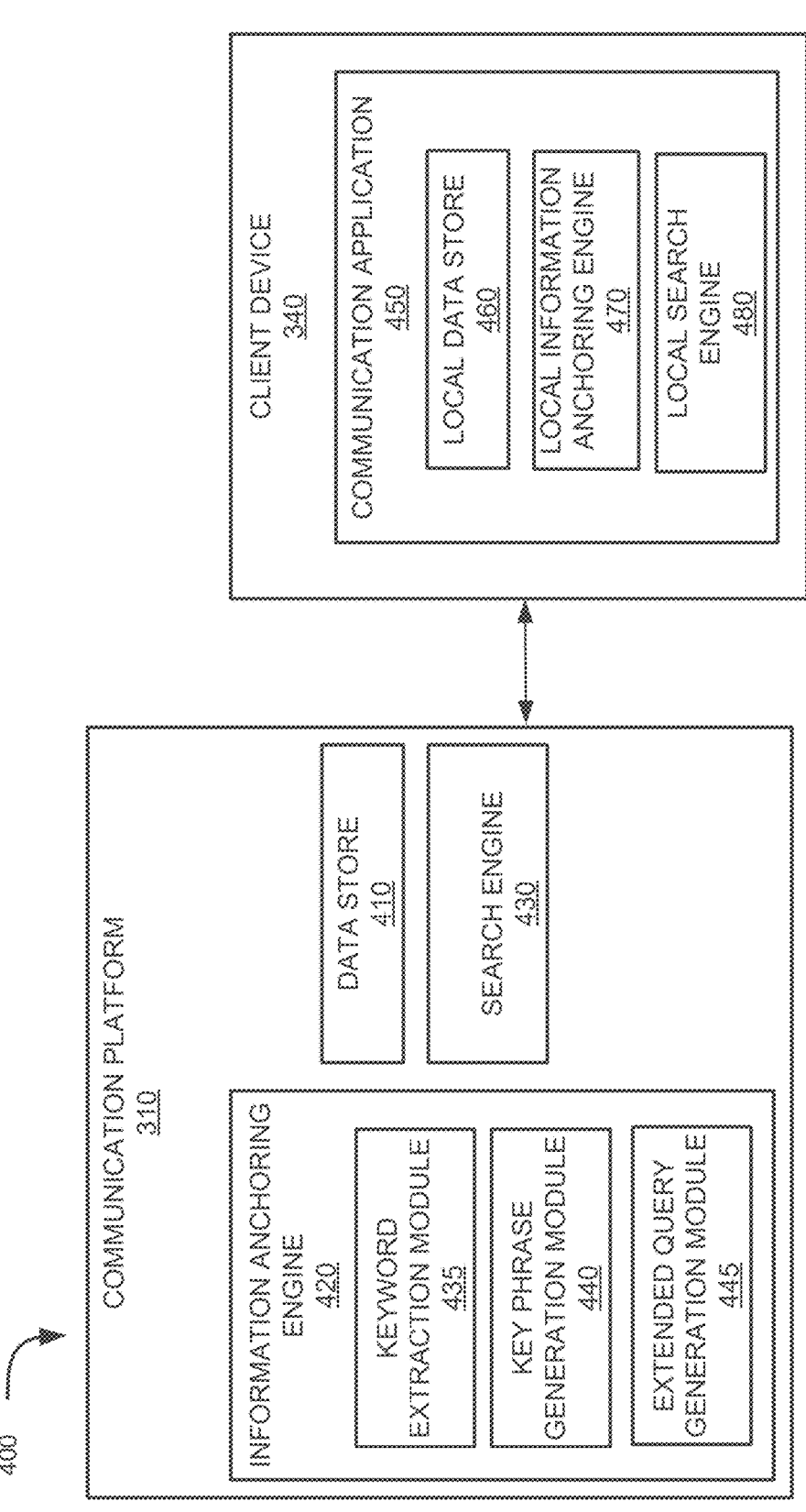
FIG. 4 shows an example system that is configured to integrate anchor information for RAG-based searches.

Now referring to FIG. 4, FIG. 4 shows an example system 400 that is configured to integrate anchor information for RAG-based searches. The communication platform 310 is in network communication with a client device 340. The client device 340 is installed with a communication application 450 provided by the communication platform 310. The communication platform 310 includes a data store 410, an information anchoring engine 420, and a search engine 430.

The data store 410 stores historical communication data associated with different client devices 340, organization data, user profile data, and other data related to an enterprise and users affiliated with the enterprise. The historical communication data can include video conference recordings, video conference transcripts, video conference summaries, phone call recordings, phone call summaries, chat messages, emails, and other types of communication data. Each set of the historical communication data has its own metadata, such as start time, end time, participants associated with a communication session, and a privacy setting. The privacy setting can be public, that is the set of communication data is available to all users affiliated with the enterprise on the communication platform. The privacy setting can be semi-public, that is the set of communication data is available to a selected group of users (e.g., within a specific department, or with certain job titles) affiliated with the enterprise on the communication platform 310. The privacy setting can be private, that is the set of communication data is only available to one user. The information anchoring engine 420 is configured to integrate certain information to the communication data associated with an enterprise.

The information anchoring engine 420 or another engine on the communication platform 310 uses or implements a text splitting tool, for example a recursive character text splitter, to divide the communication data associated with an enterprise into data chunks within a predetermined size threshold. The predetermined size threshold can be a byte size (e.g., 32 KB) or a word count (e.g., 500 words). The text splitting tool splits one set of communication data based on time or topics, and keeps the words in one sentence in one data chunk. For example, a meeting transcript is divided into multiple data chunks by time to satisfy the predetermined size threshold. The data chunks with corresponding metadata are also stored in the data store 410.

The information anchoring engine 420 includes a keyword extraction module 435 to extract keywords from a data chunk, using a keyword extraction algorithm (e.g., Text Rank, RAKE). The information anchoring engine 420 also includes a key phrase generation module 440 to generate one or more key phrases for the data chunk. The one or more key phrases can be a summary or a topic of the data chunk. For example, a key phrase "importance of the leadership in setting company culture" is the topic of a data chunk. In some examples, the key phrases are extractive, for example extracted from the data chunk. The key phrase generation module 440 uses or implements an extraction algorithm, similar to the keyword extraction algorithm, to extract key phrases from the data chunk. In some examples, the key phrases are abstractive, for example paraphrased from the data chunk. The key phrase generation module 440 uses or implements a trained generative AI model to generate abstractive key phrases for a data chunk. The information anchoring engine 420 also includes an extended query generation module 445, configured to generate one or more extended queries for a data chunk, using a trained generative AI model. In some examples, the one or more extended queries include questions to which the content of the data chunk includes at least part of the answer. For example, an extended query for a data chunk is "what is the role of leadership in conflict resolution?" The extended query generation module can generate multiple extended queries for a data chunk to include possible questions to which the data chunk can include at least part of the answer. The generative AI model for key phrase generation and the generative AI model for extended query generation can be the same or different AI models. Examples of the generative AI models include a generative pre-trained transformer (GPT) model and its variants and a Claudes model and its variants.

The information anchoring engine 420 integrates (or attaches, or anchors) the keywords, key phrases, and extended queries to a corresponding data chunk. The keywords, key phrases, and extended queries can be called anchor information for the corresponding data chunk. In some examples, the information anchoring engine 420 generates embeddings for the extended queries, using an embedding model. The extended query embeddings can also be attached or anchored to the data chunk. In some examples, the information anchoring engine 420 or another engine on the communication platform 310 generates embedding for data chunks and attaches the data chunk embeddings to corresponding data chunks.

The search engine 430 is configured to identify and retrieve a set of communication data related to a user query based on the information anchored to the communication data in the data store 410. The search engine 430 receives a user query from a client device 340 associated with a user affiliated with an enterprise. The search engine 430 or another engine on the communication platform 310 generates a query embedding for the user query.

The search engine 430 identifies relevant data chunks by comparing the user query to data chunks stored in the data store 410. The search engine 430 uses or implements a text comparison algorithm, for example a best matching 25 (BM25) algorithm or a term frequency-inverse document frequency (TF-IDF) algorithm, to rank data chunks based on syntactic similarity between the data chunks and the user query. For example, the syntactic similarity is based on the amount or frequency of query terms of the user query appearing in each data chunk. Data chunks with a syntactic similarity greater than a threshold value are identified as relevant data chunks for the user query. Alternatively, or additionally, the search engine 430 determines a similarity score for a data chunk by comparing the user query embedding to a data chunk embedding for the data chunk. If the similarity score is greater than a predetermined threshold value, the data chunk is identified as a relevant data chunk. However, when searching in huge amounts of data chunks, as is usually the case for an enterprise user on the communication platform 310, it is not enough to solely rely on text comparison and embedding comparison as describe above, as it may miss certain communication data that are relevant to a user query. As the data chunks are attached or anchored with keywords, key phrases, and extended queries, the search engine 430 also identifies relevant data chunks for a user query based on the anchored keywords, key phrases, or extended queries. For example, the search engine 430 compares the query embedding with an extended query embeddings anchored to data chunks. The search engine 430 determines a similarity score for each extended query embedding with respect to the query embedding. If a similarity score for an extended query embedding satisfies a threshold, for example greater than the threshold, the corresponding data chunk is identified as a relevant data chunk for the user query. Alternatively, or additionally, the search engine 430 compares the user query with keywords or key phrases anchored to a data chunk to determine matching or similarity. This way, the search engine 430 can identify multiple data chunks for retrieval to generate an answer to the user query.

In some examples, the search engine 430 implements or uses an AI-based reranking model to rerank the identified relevant data chunks based on their relevancy to the user query. A subset of the identified relevant data chunks, for example data chunks with the top N relevancy scores, is selected and retrieved for answer generation. The search engine 430 generates an answer to the user query based on the subset of relevant data chunks. In some examples, the search engine 430 uses or implements a generative AI model to generate an answer based on the subset of relevant data chunks. Integration of keywords, key phrases, and extended queries expands the search scope and improves search recalls, thus improving RAG quality and efficiency for responding to user queries.

The client device 340 is installed with a communication application 450 provided by the communication platform 310. In some examples, the communication application 450 installed on the client device 340 include a local data store 460, a local information anchoring engine 470, and a local search engine 480. The local data store 460 stores communication data or communication data chunks associated with communication sessions hosted or joined by a local user associated with the client device 340. The local information anchoring engine 470 is configured to obtain and attach keywords, key phrases, and extended queries to communication data chunks stored in the local data store 460 or data chunks stored in the data store 410 on the communication platform 310 accessible by the client device 340, similar to the information anchoring engine 420 as described above. The local search engine 480 is configured to search the local data store 460 or the data store 410 on the communication platform 310 to identify relevant communication data chunks for generating an answer to a user query, similar to the search engine 430 as described above.

The communication application 450 also includes a graphical user interface (GUI) for receiving user queries and displaying answers to user queries. In some examples, the GUI includes a search box for a user to enter a user query. In some examples, the GUI includes a chat box for a user to interact with chat bot representing the search engine 430 or the local search engine 480. The user can also provide user feedback on the answer, for example pressing or clicking a thumbs up or thumbs down button.

Figure 5:
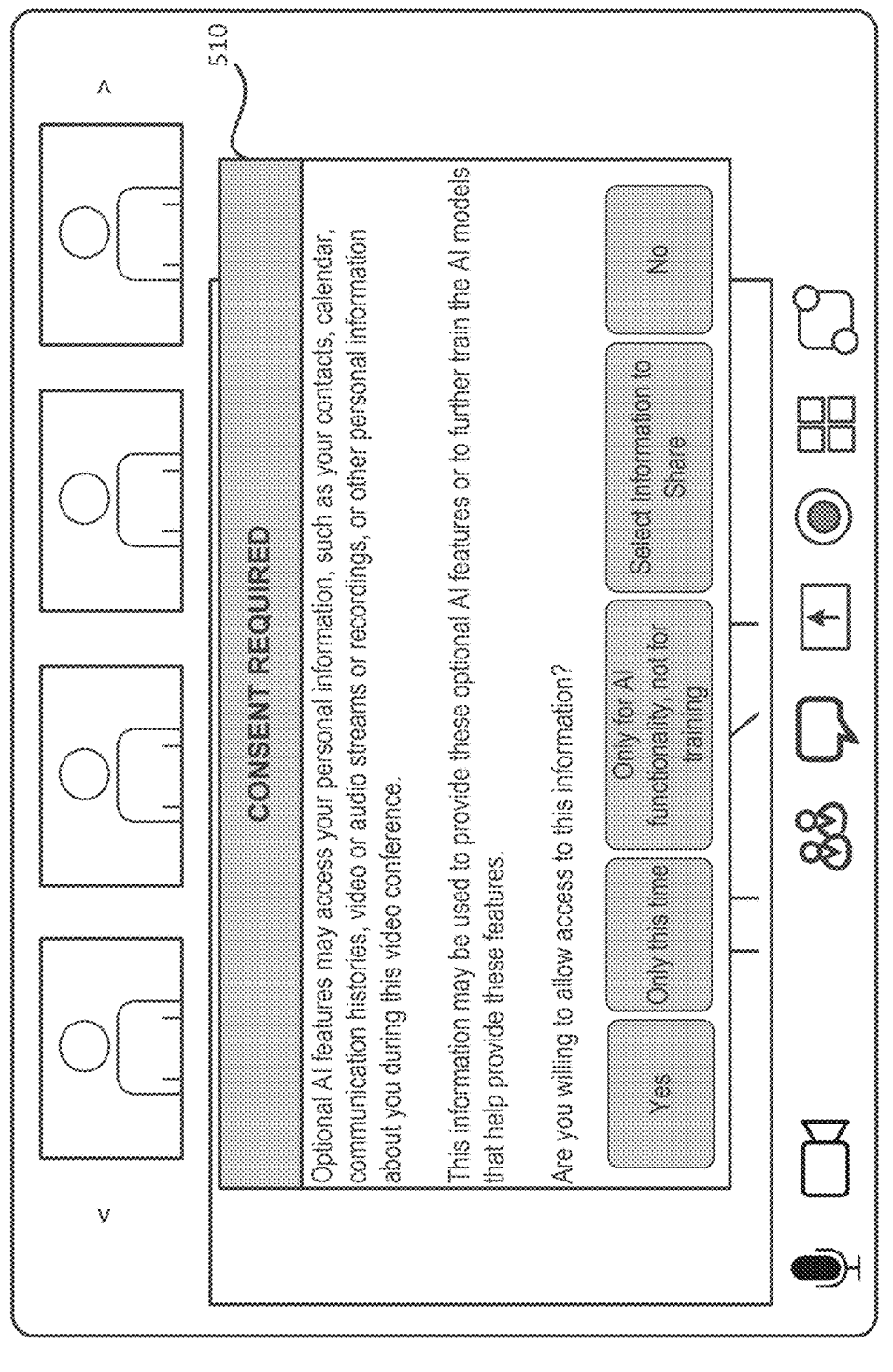
FIG. 5 shows an example GUI displaying a consent authorization request for accessing personal data.

Referring now to FIG. 5, FIG. 5 shows an example GUI 500 displaying a consent authorization request for accessing personal data. In some examples according to the present disclosure, a user may select an option to use one or more optional AI features available from a communication platform, such as the chat and video conference provider 110 or the chat and video conference provider 210. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to provide training data for the underlying AI models, the user may be provided with an option to consent, or deny consent, to access and use some or all of the user's personal information. In general, Applicant's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default—account owners and administrators control whether to enable these AI features for their accounts, and if enabled, individual users may determine whether to provide consent to use their personal information.

As can be seen in FIG. 5, a user has engaged in a video conference and has selected an option to use an available optional AI feature. In response, the GUI has displayed a consent authorization window 510 for the user to interact with. The consent authorization window informs the user that their request may involve the optional AI feature accessing multiple different types of information, which may be personal to the user. The user can then decide whether to grant permission or not to the optional AI feature generally, or only in a limited capacity. For example, the user may select an option to only allow the AI functionality to use the personal information to provide the AI functionality, but not for training of the underlying AI models. In addition, the user is presented with the option to select which types of information may be shared and for what purpose, such as to provide the AI functionality or to allow use for training underlying AI models.

Referring now to FIG. 6, FIG. 6 shows an example process 600 for integration of anchor information for RAG-based searches. The example process 600 will be discussed with respect to the system 300 shown in FIG. 3 and the system 400 shown in FIG. 4; however, any suitable system for integration of anchor information for RAG-based searches may be used.

At block 602, a communication platform 310 accesses communication data on the communication platform 310 associated with an enterprise. The information anchoring engine 420 on the communication platform 310 accesses the communication data associated with the enterprise stored in the data store 410 on the communication platform 310. The communication data includes video conference recordings, video conference transcripts, chat messages, emails, and other types of communication data. Each set of the communication data has its own metadata, such as start time, end time, participants associated with a communication session, and a privacy setting.

At block 604, the communication platform 310 divides the communication data into multiple data chunks. The information anchoring engine 420 or another engine on the communication platform 310 uses or implements a text splitting tool, for example a recursive character text splitter, to divide the communication data into multiple data chunks within a predetermined size threshold (e.g., 500 words). For example, a recursive character text splitter divides a meeting transcript into multiple data chunks by time. Each data chunk is no more than 500 words. The multiple data chunks are stored in the data store 410 on the communication platform 310.

At block 606, the communication platform 310 generates one or more extended queries for each data chunk of the multiple data chunks using a generative AI model. The extended query generation module 445 of the information anchoring engine 420 uses or implements a trained generative AI model to generate one or more extended queries for a data chunk. For example, the trained generative AI model can be a GPT model. The extended queries include questions to which the data chunk can provide at least part of the answer. In some examples, the key phrase generation module 440 of the information anchoring engine 420 uses or implements a trained generative AI model to generate one or more key phrases for a data chunk. The trained generative AI model for key phrase generation and the trained generative AI model for extended query generation can be the same or different generative AI models. In some examples, the keyword extraction module 435 of the information anchoring engine 420 uses or implements an extraction algorithm to extract multiple keywords from a data chunk. The extended queries, key phrases, and keywords are anchored to the corresponding data chunk, for example as labels or annotations. In some examples, the information anchoring engine 420 or another engine on the communication platform 310 uses or implements an embedding model to generate embeddings for the extended queries, and anchor extended query embeddings to the corresponding data chunk as well. In some examples, the information anchoring engine 420 or another engine on the communication platform 310 uses or implements an embedding model to generate an embedding for a data chunk, and anchor the data chunk embedding to the data chunk as well.

At block 608, the communication platform 310 receives a user query from a client device 340. The search engine 430 on the communication platform 310 receives a user query. In some examples, a user enters the user query via a GUI of a client device 340. The user search query can be a phrase including multiple words. Alternatively, or additionally, the user search query is a question including multiple words.

At block 610, the communication platform 310 identifies, from the multiple data chunks, one or more relevant data chunks for the user query at least by comparing the user query with the one or more extended queries associated with each data chunk of the multiple data chunks. The search engine 430 on the communication platform 310 receives a user query from a client device 340, and compares the user query with data chunks or information anchored to the data chunks to identify one or more relevant data chunks for the user query, generally as described in FIG. 4. In some examples, the search engine 430 uses or implements an embedding model to generate an embedding for the user query. The search engine 430 determines a similarity score for an extended query with respect to the user query based on the extended query embedding and the user query embedding. If the similarity score is greater than a predetermined threshold value, the data chunk corresponding to the extended query is identified as relevant to the user query. In some examples, the search engine 430 additionally compares the user query with keywords or key phrases anchored to data chunks to determine if corresponding data chunks are relevant to the user query. In some examples, the search engine 430 additionally compares the user query embedding with data chunk embeddings to determine if corresponding data chunks are relevant. In some examples, the search engine 430 additionally determines if a data chunk includes most of the words in the user query to determine if the data chunk is relevant to the user query.

At block 612, the communication platform 310 provides an answer to the user query based on the one or more relevant data chunks. As described at block 610, the search engine 430 identifies one or more relevant data chunks for the user query. In some examples, the search engine 430 uses or implements an AI-based re-ranking model to generate a relevancy score for each relevant data chunk and re-rank the one or more relevant data chunks based on corresponding relevancy scores. The search engine 430 retrieves data chunks with the top N relevancy scores for answer generation. In some examples, the search engine 430 or another engine on the communication platform 310 uses or implements a trained generative AI model to generate an answer to the user query based on a subset of the one or more relevant data chunks with the top N relevancy scores. In some examples, the answer is displayed next to the user query in a GUI of the communication application 450.

The example process 600 illustrates a method for integration of anchor information for RAG-based searches. However, not every step in the example process 600 may be needed, some other steps may be added, or the order of the steps may be changed. Alternatively, the example process 600 can be performed by a communication application 450 installed on a client device 340.

Figure 7:
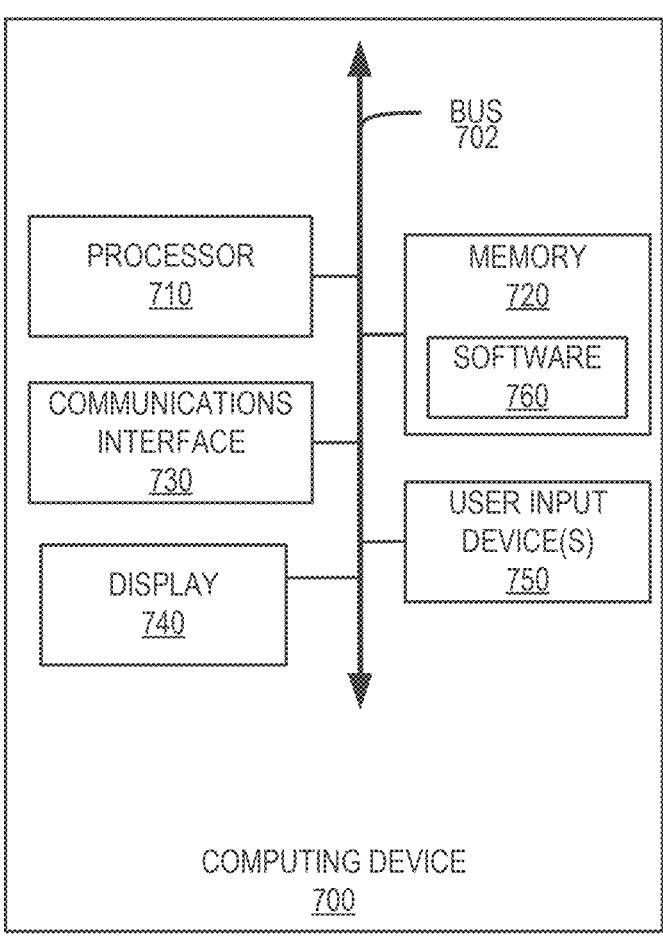
FIG. 7 shows an example computing device suitable for use with example systems and methods for integration of anchor information for RAG-based searches.

Referring now to FIG. 7, FIG. 7 shows an example computing device 700 suitable for use in example systems or methods for integration of anchor information for RAG-based searches. The example computing device 700 includes a processor 710 which is in communication with the memory 720 and other components of the computing device 700 using one or more communications buses 702. The processor 710 is configured to execute processor-executable instructions stored in the memory 720 to perform one or more methods for resource management according to different examples, such as part or all of the example process 600 described above with respect to FIG. 6. In some embodiments, the computing device may include software 760 for executing one or more methods described herein, such as for example, one or more steps of process 600. The computing device 700, in this example, also includes one or more user input devices 750, such as a keyboard, mouse, touchscreen, microphone, etc., to accept user input. The computing device 700 also includes a display 740 to provide visual output to a user.

The computing device 700 also includes a communications interface 730. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
accessing communication data on a communication platform associated with an enterprise;
dividing the communication data into multiple data chunks;
generating one or more extended queries for each data chunk of the multiple data chunks using a first generative AI model;
generating one or more extended query embeddings for the one or more extended queries associated with each data chunk of the multiple data chunks using an embedding model;
determining one or more topic phrases associated with each data chunk of the multiple data chunks using a second generative AI model;
generating one or more topic phrase embeddings for the one or more topic phrases associated with each data chunk of the multiple data chunks using the embedding model;
receiving a user query from a client device;
generating a user query embedding for the user query using the embedding model;
identifying, from the multiple data chunks, one or more relevant data chunks for the user query at least by comparing the user query embedding with the one or more extended query embeddings associated with each data chunk of the multiple data chunks and the one or more topic phrase embeddings associated with each data chunk of the multiple data chunks; and
providing an answer to the user query based on the one or more relevant data chunks.

2. The method of claim 1, further comprising:
extracting one or more keywords associated with each data chunk of the multiple data chunks; and
identifying the one or more relevant data chunks from the multiple data chunks by comparing the user query to the one or more keywords.

3. The method of claim 1, further comprising:
ranking the one or more relevant data chunks to obtain an ordered list of relevant data chunks using a reranking model;

selecting a subset of one or more relevant data chunks from the ordered list of relevant data chunks; and providing the answer to the user query based on the subset of one or more relevant data chunks.

4. The method of claim 3, wherein method further comprises:

generating a relevancy score for a relevant data chunk of the one or more relevant data chunks with respect to the user query; and ranking the one or more relevant data chunks based on corresponding relevancy scores.

5. The method of claim 1, further comprising:

generating the answer to the user query based on the one or more relevant data chunks, using a third generative AI model.

6. A system comprising:

a communications interface;

a non-transitory computer-readable medium; and one or more processors communicatively coupled to the communications interface and the non-transitory computer-readable medium, the one or more processors configured to execute processor-executable instructions stored in the non-transitory computer-readable medium to:

access communication data on a communication platform associated with an enterprise;

divide the communication data into multiple data chunks;

generate one or more extended queries for each data chunk of the multiple data chunks using a first generative AI model;

generate one or more extended query embeddings for the one or more extended queries associated with each data chunk of the multiple data chunks;

determine one or more topic phrases associated with each data chunk of the multiple data chunks using a second generative AI model;

generate one or more topic phrase embeddings for the one or more topic phrases associated with each data chunk of the multiple data chunks;

receive a user query from a client device;

generate a user query embedding for the user query;

identify, from the multiple data chunks, one or more relevant data chunks for the user query at least by comparing the user query embedding with the one or more extended query embeddings associated with each data chunk of the multiple data chunks and the one or more topic phrase embeddings associated with each data chunk of the multiple data chunks; and provide an answer to the user query based on the one or more relevant data chunks.

7. The system of claim 6, wherein the one or more processors are configured to execute further processor-executable instructions stored in the non-transitory computer-readable medium to:

extract one or more keywords associated with each data chunk of the multiple data chunks; and identify the one or more relevant data chunks from the multiple data chunks by comparing the user query to the one or more keywords.

8. The system of claim 6, wherein the one or more processors are configured to execute further processor-executable instructions stored in the non-transitory computer-readable medium to:

rank the one or more relevant data chunks to obtain an ordered list of relevant data chunks using a reranking model;

select a subset of the one or more relevant data chunks from the ordered list of relevant data chunks; and provide the answer to the user query based on the subset of the one or more relevant data chunks.

9. The system of claim 7, wherein the one or more processors are configured to execute further processor-executable instructions stored in the non-transitory computer-readable medium to:

generating a relevancy score for a relevant data chunk of the one or more relevant data chunks with respect to the user query; and select a subset of the one or more relevant data chunks based on corresponding relevancy scores.

10. The system of claim 6, wherein the one or more processors are configured to execute further processor-executable instructions stored in the non-transitory computer-readable medium to:

generate the answer to the user query based on the one or more relevant data chunks, using a third generative AI model.

11. A non-transitory computer-readable medium comprising processor-executable instructions configured to cause one or more processors to:

access communication data on a communication platform associated with an enterprise;

divide the communication data into multiple data chunks;

generate one or more extended queries for each data chunk of the multiple data chunks using a first generative AI model;

generate one or more extended query embeddings for the one or more extended queries associated with each data chunk of the multiple data chunks;

determine one or more topic phrases associated with each data chunk of the multiple data chunks using a second generative AI model;

generate one or more topic phrase embeddings for the one or more topic phrases associated with each data chunk of the multiple data chunks;

receive a user query from a client device;

generate a user query embedding for the user query;

identify, from the multiple data chunks, one or more relevant data chunks for a user query at least by comparing the user query embedding with the one or more extended query embeddings associated with each data chunk of the multiple data chunks and the one or more topic phrase embeddings associated with associated with each data chunk of the multiple data chunks; and provide an answer to the user query based on the one or more relevant data chunks.

12. The non-transitory computer-readable medium of claim 11, further comprising processor-executable instructions configured to cause one or more processors to:

extract one or more keywords associated with each data chunk of the multiple data chunks; and identify the one or more relevant data chunks from the multiple data chunks by comparing the user query to the one or more keywords.

13. The non-transitory computer-readable medium of claim 11, further comprising processor-executable instructions configured to cause one or more processors to:

rank the one or more relevant data chunks to obtain an ordered list of relevant data chunks using a reranking model;

select a subset of the one or more relevant data chunks from the ordered list of relevant data chunks; and provide the answer to the user query based on the subset
of the one or more relevant data chunks.

14. The non-transitory computer-readable medium of
claim 13, further comprising processor-executable instruc-
tions configured to cause one or more processors to:

generate a relevancy score for a relevant data chunk of the
one or more relevant data chunks with respect to the
user query; and select the subset of the one or more relevant data chunks
based on corresponding relevancy scores; and generate the answer to the user query based on the subset
of the one or more relevant data chunks, using a third
generative AI model.

15. The method of claim 1, wherein determining one or
more topic phrases associated with each data chunk of the
multiple data chunks comprises extracting the one or more
topic phrases from each data chunk of the multiple data
chunks.

16. The method of claim 1, wherein determining one or
more topic phrases associated with each data chunk of the
multiple data chunks comprises paraphrasing each data
chunk of the multiple data chunks.

\* \* \* \* \*